March 14, 1961 H. W. EKHOLM 2,974,758
RAILWAY TRUCK BRAKE STRUCTURE
Filed Nov. 22, 1957

Inventor
Herbert W. Ekholm
By Rodney Bedell
atty.

United States Patent Office
2,974,758
Patented Mar. 14, 1961

2,974,758

RAILWAY TRUCK BRAKE STRUCTURE

Herbert W. Ekholm, Chicago, Ill., assignor to Chicago Railway Equipment Company, Chicago, Ill., a corporation of Illinois Filed Nov. 22, 1957, Ser. No. 698,177

3 Claims. (Cl. 188—233.3)

The invention relates to railway rolling stock and more particularly to railway truck brake structure including a brake beam slidably supported upon brackets on the truck framing for movement toward and from the truck wheels.

The objects of the invention are to prevent undue movement of the beam laterally of the truck with resulting disalignment of the brake shoes and wheel treads, and undue friction and wear between the ends of the beam and the opposing faces of the framing supports for the beam.

These general objects are attained by the provision of elements on the brake beam projecting beyond the ends of the beam and yielding lengthwise of the beam upon contact with upright surfaces in the truck side framing. By mounting these yielding elements on the beam itself, the advantages of the yielding elements are incorporated in the beam and no installation work is required on the truck framing. This is particularly advantageous when a beam including the invention is substituted for another type of beam previously mounted in the truck. Also, the frictional wear between the beam and the truck framing is distributed over a substantial distance. In addition, the yielding elements or spring means are readily replaceable when the brake beam has been withdrawn from the guide recess.

In the accompanying drawings illustrating the invention:

Figure 2:
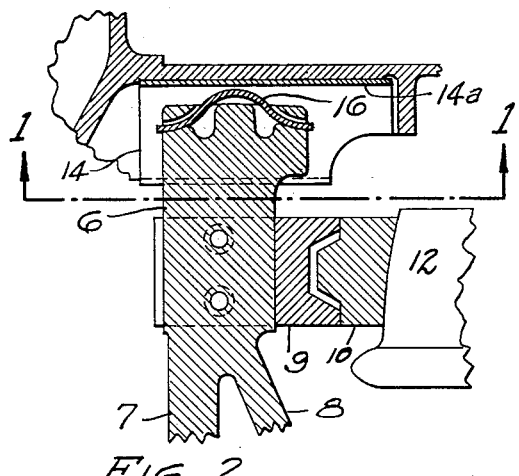
Figure 2 is a horizontal section on line 2—2 of Figure 1.
Figure 3:
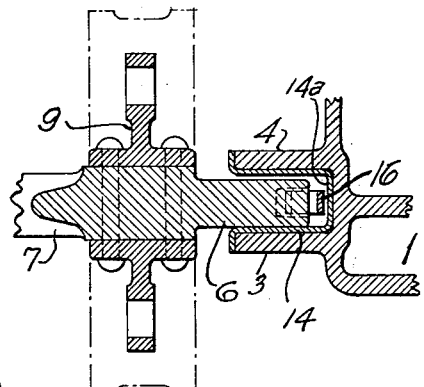
Figure 3 is a vertical section on line 3—3 of Figure 1.
Figure 1:
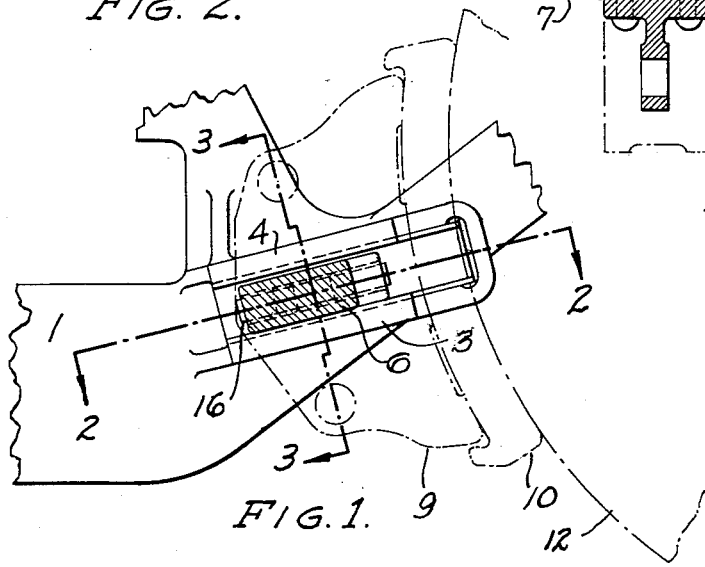
Figure 1 is a side view of a portion of a truck side frame showing part of the adjacent wheel and the brake head and shoe with a portion of the beam being sectioned on line 1—1 of Figure 2.

The truck framing is shown as a freight car truck side frame having a lower member 1 provided with inboard shelves or brackets 3, 4 in which slides the extension portion 6 of a brake beam having the usual compression member 7 and tension member 8 mounting a brake head 9 carrying a brake shoe 10 applicable to the wheel tread 12. A wear plate 14 of hardened steel fits within brackets 3, 4 and protects the softer cast metal side frame from wear due to the sliding of extension 6 along the brackets.

The above described structure is duplicated at the opposite end of the beam and, in itself, does not constitute the present invention. End portion or extension 6 is slotted (as best shown in Figure 2) or otherwise adapted to receive in free fit and without attachment the end portions or reverse curved portions of a flat spring 16, the intermediate or curved center portion of which is bowed outwardly to oppose the upright face 14a of wear plate 14.

As the brake beam tends to move endwise from a normal centered position, the spring 16 at one end of the beam will be compressed and yieldingly resist the movement and will return the beam to its normal position. The action of spring 16 is uniform throughout the length of the beam travel. In the event of spring failure, it is readily replaced.

Figure 4:
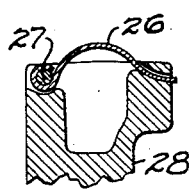
Figure 4 is a detail horizontal section corresponding to a part of Figure 2 but illustrating another form of the invention.

Figure 4 shows a spring 26 with one end curled around a retaining pin 27 or otherwise attached to the brake beam, a curved center portion extending beyond the end surface of the brake beam, and a reverse curved end portion the opposite end of the spring slidable in its slot or passage in the brake beam end portion or extension 28.

Figure 5:
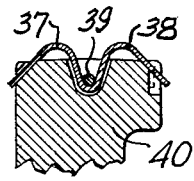
Figure 5 is similar to Figure 4 but illustrates a third form of the invention.

Figure 5 shows a spring 36 having reversed curved portions 37, 38 intermediate its ends, there being a curved center portion between the reverse curved portions for receiving a retaining pin 39 or other holding means inserted through the curved center portion of the brake beam end extension 40 and a passage for confining movement of one of the reverse curved portions.

Figure 6:
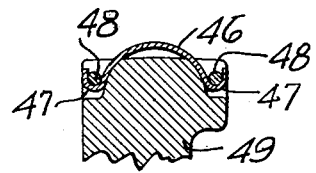
Figure 6 is similar to Figures 4 and 5 but illustrates a fourth form of the invention.

Figure 6 shows a spring 46 having a return bend 47 at each of its ends, each engaging an individual retaining pin 48 passing through the beam end extension 49.

Although the provision of spring means at each end of the beam would be a preferred arrangement, if the spring means were provided at only one end of the beam, the essential feature of centering the beam would be present. The end of the beam extension 6, 28, 40, 49 at the other end of the beam would slide along the corresponding bracket in the truck side frame.

Each of the different forms of the invention attains the objectives and possesses the advantages stated above. These different forms are illustrative of the invention. Other modifications may be substituted for those shown without departing from the spirit of the invention and the exclusive use of those forms coming under the scope of the claims is contemplated.

What is claimed is:

1. In a railway truck brake assembly having a brake beam supported on the truck framing, the combination therewith comprising a pair of brake beam guide recesses slidably receiving the brake beam end portions, spring means freely movable within the end portion of said brake beam, and receiving means at the end portion for confining the movement of said spring means within selected limits, said spring means having a curved center portion and reverse curved end portions, said receiving means including a pair of passages shaped to accommodate freely said spring means, each of said passages extending from a respective side of said brake beam to the adjacent end thereof, said reverse curved portions disposed within said passages and said curved outer portion disposed over a portion of the end surface of said brake beam such that said spring means will flex substantially equally in opposite directions upon contact with said guide recess in response to transverse movement of said brake beam and return said brake beam to a centered position, said spring means being easily and readily removable when the brake beam has been withdrawn from the guide recess.

2. In a railway truck brake assembly having a brake beam supported on the truck framing, the combination therewith comprising a pair of brake beam guide recesses slidably receiving the brake beam end portions, spring means freely movable within the end portion of said brake beam, and receiving means at the end portion for confining the movement of said spring means within selected limits, said spring means having a curved center portion and reverse curved end portions, said receiving means including a pair of passages shaped to accommodate freely said spring means, each of said passages extending from a respective side of said brake beam to the adjacent end thereof, said reverse curved portions disposed within said passages and said curved outer portion disposed over a portion of the end surface of said brake beam such that said spring means will flex substantially equally in opposite directions upon contact with said guide recess in response to transverse movement of said brake beam and return said brake beam to a centered position, said spring means being easily and readily removable when the brake beam has been withdrawn from the guide recess.

3. In a railway truck brake assembly having a brake beam supported on the truck framing, the combination therewith comprising a pair of brake beam guide recesses slidably receiving the brake beam end portions, spring means having a curved center portion disposed toward the center of the brake beam and reverse curved portions at least a portion of which is disposed outward of the end surface of the brake beam, and receiving means at the end portion of the brake beam for confining movement of at least one of said reverse curved end portions within selected limits, the receiving means including holding means for holding the spring means at the curved center portion thereof in fixed relationship to said brake beam such that upon transverse movement of said brake beam the spring means will contact said guide recess and flex substantially equally in opposite directions and return said brake beam to a centered position, said spring means being easily and readily removable when the brake beam has been withdrawn from the guide recess.

References Cited in the file of this patent
UNITED STATES PATENTS

| | | |
|---|---|---|
| 412,285 | Mulford | Oct. 8, 1889 |
| 429,364 | Schofield | June 3, 1890 |
| 590,645 | Gibson | Sept. 28, 1897 |
| 824,318 | Thorp | June 26, 1906 |
| 1,033,139 | Williams | July 23, 1912 |
| 1,166,589 | Holmes | Jan. 4, 1916 |
| 2,219,600 | Potter | Oct. 29, 1940 |
| 2,263,949 | Harle | Nov. 25, 1941 |
| 2,360,424 | Kauffman | Oct. 17, 1944 |
| 2,361,033 | Johnson | Oct. 24, 1944 |
| 2,529,352 | Sale | Nov. 7, 1950 |
| 2,808,906 | Busch | Oct. 8, 1957 |